United States Patent [19]
Vohler

[11] 4,015,068
[45] Mar. 29, 1977

[54] GRAPHITIZATION FURNACE
[75] Inventor: Otto Vohler, Nordendorf, Germany
[73] Assignee: Sigri Elektrographit GmbH, Augsburg, Germany
[22] Filed: Oct. 20, 1975
[21] Appl. No.: 624,274
[30] Foreign Application Priority Data
Dec. 7, 1974  Germany .......................... 2457923
[52] U.S. Cl. ........................................ 13/7; 13/23; 423/448
[51] Int. Cl.² ........................................ F27D 11/04
[58] Field of Search ............ 13/7, 23; 423/448, 460
[56] References Cited
UNITED STATES PATENTS
1,029,121  6/1912  Heroult ................................. 13/7
1,190,856  7/1916  Brown ................................. 13/23

*Primary Examiner*—R. N. Envall, Jr.
*Attorney, Agent, or Firm*—Herbert L. Lerner

[57] ABSTRACT

Furnace for the graphitization of carbon bodies in which carbon bodies arranged in continuous row are clamped between two electrodes and heated up to the graphitization temperature by electric resistance heating. The carbon bodies are surrounded by movable shell-shaped walls and the space between the bodies and the walls contains no granular isolation materials. The furnace permits the graphitization of carbon bodies with smaller energy consumption and a shorter time.

3 Claims, 1 Drawing Figure

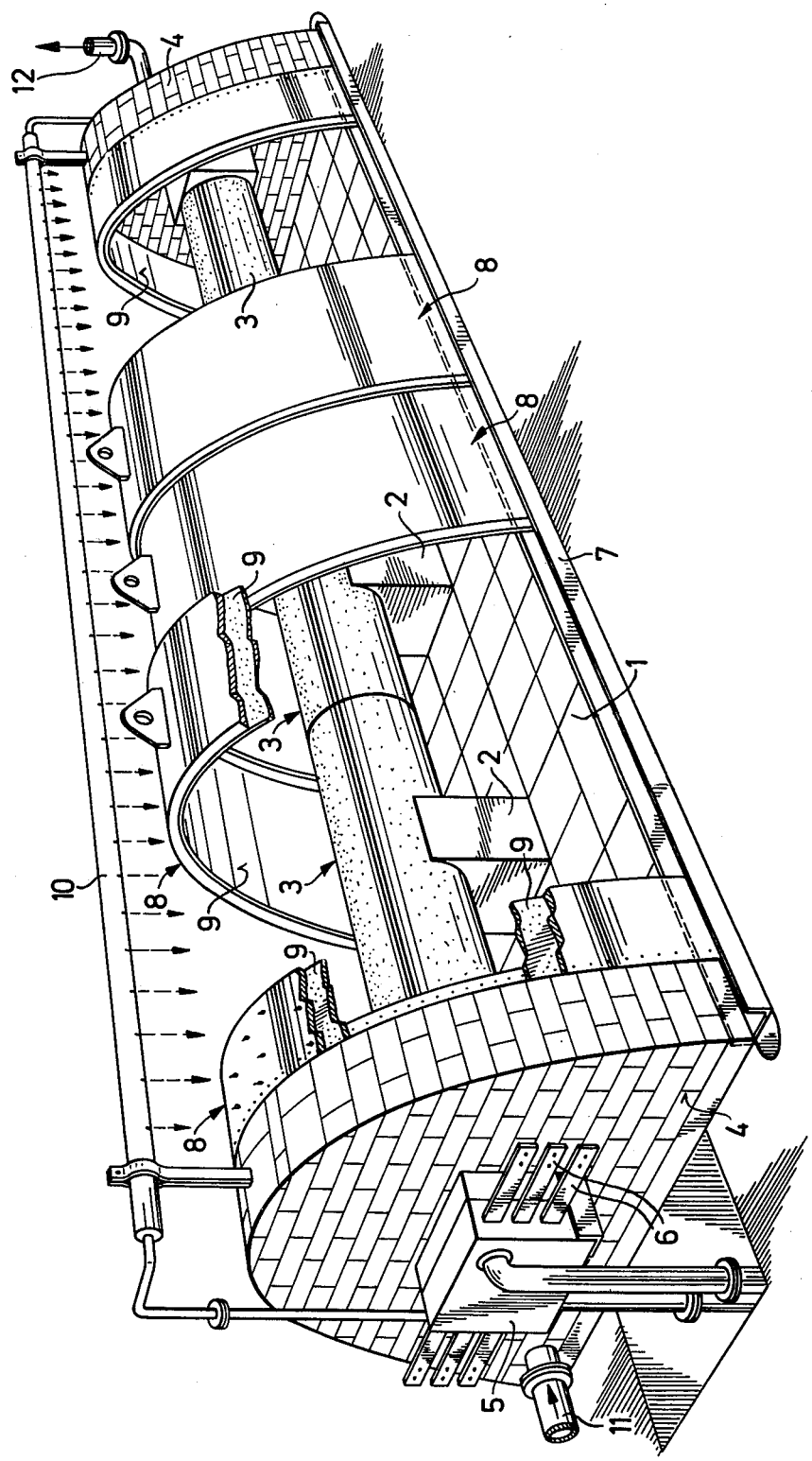

GRAPHITIZATION FURNACE

BACKGROUND OF THE INVENTION

1. Field of the Invention

This invention relates to the production of artificial graphite and more particularly to a new and improved furnace for graphitizing carbon bodies to artificial graphite.

2. Description of the Prior Art

Artificial carbon is made by heating amorphous carbon at high temperature converting the carbon to graphite which is a crystalline form of carbon. The source of carbon may be coal, but is preferably derived from petroleum in the form of low-ash coke. The coke is mixed with coking binder such as coal pitch and formed into the required shape called "green" body or green electrode. After preliminary heating to a temperature up to about 2000° C, the carbon body is heated above about 2200° C to a temperature of nearly 3000° C and retained at the high temperature for a sufficient time for the formation of the hexagonal crystal pattern. The thermal conductivity of graphite is higher than carbon and this combined with a low coefficient of thermal expansion gives it high resistance to shock. Although carbon and graphite are extensively used in electrical applications, graphite, despite its high cost, is usually selected as anodes for electrical applications because of higher purity, higher electrical conductivity, greataer ease of machining and high oxidation resistance.

Discontinuously operated furnaces for graphitization of carbon bodies are known in the art as illustrated by the Acheson furnace and consist basically of two graphite electrodes which are disposed in the end walls of the furnace, between which electrodes the bodies to be graphitized are layered between granular resistance and isolation material. In order to heat the carbon bodies, the graphite electrodes which are short-circuited by the furnace content, are electrically connected to a current source, whereby the generated Joule's heat causes a rise of the furnace temperature to 2200° up to approximately 3000° C. Depending on the size of the furnace, the period of time required to heat up the furnace is approximately 1 – 3 days and the following cooling period is approximately 5 – 12 days.

A considerable disadvantage of the Acheson process is the unfavorable ratio of the heating and cooling periods and the resulting low production efficiency. The large quantities of resistance and isolation materials used in the process require special transport, sorting and cleaning devices. The carbon bodies must be layered with great care to avoid resistance variations, without fully eliminating localized resistance variations and the resulting temperature peaks during the heating up period which deteriorate the quality of the graphite bodies. Finally, the efficiency of the Acheson method is comparatively low because in addition to the graphite bodies, a large quantity of resistance material is also heated up to the graphitization temperature and only a samll part of the thermal energy supplied is recovered. Further disadvantages of this method are the difficulties to contain and discharge the poisonous gases which are generated during graphitization, for example, sulfur dioxide and carbon monoxide. Also resistor material becomes attached to the graphite bodies and the former has to be removed by grinding or other mechanized operations.

It is known to clamp one or several carbon bodies which are arranged in a row between two graphite electrodes and to heat the body to graphitization temperature by the direct passage of electric current. In this procedure at least one electrode is movable and is pressed by a force which acts in the direction of the furnace, against the carbon bodies which butt against the second electrode, in order to avoid undesirable high voltages at the contacts or even a discontinuity of the current path. To avoid oxidation of the carbon bodies, the whole furnace space is filled with granular isolation materials, for example, coke. While this type of furnace permits faster heating up time, the cooling period is only insignficantly shortened and the adhesion of the isolation material to the graphite bodies and the turnover of large quantities of isolation material is unchanged. Furthermore, it is impossible to completely contain the noxious gases that emerge from the open furnace by exhaust hoods which could be mounted above the furnace.

SUMMARY OF THE INVENTION

An object of the present invention is to provide a furnace for the efficient graphitization of carbon bodies.

In accordance with the present invention a furnace for the graphitization of carbon bodies by direct resistance heating comprises two current conducting electrodes movable in the longitudinal furnace axis, carbon bodies in an arrangement of one or several continuous rows clamped between said electrodes with the end surface of each body in contact with an end surface of an adjacent body in the row, and each end surface of bodies at the end of a row contacting an electrode, carrier members disposed in the furnace floor for receiving the carbon bodies, said furnace gas-tightly enclosing said carbon bodies, said furnace having shell-shaped walls with movable segments and said furnace having lavers consisting of non-combustible isolation materials to protect said carbon bodies from attack by oxygen from the air, and said furnace in the space between the carbon bodies and the furnace walls having no granular isolation material disposed therein.

In a preferred embodiment of the invention, the furnace walls are furnished with a water cooling system and, on the inside, with an isolation layer containing graphite felt and graphite foil. Also the furnace walls contain suitable means for introduction of a protective gas and for discharging the protective gases and combustion gases.

DESCRIPTION OF THE DRAWING

Other features which are considered as characteristic for the invention are set forth in the appended claims.

Although the invention is illustrated and described herein as apparatus for graphitization of carbon bodies in a furnace, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

The accompanying drawing is a perspective view of a graphitization furnace with a portion of the shell-shaped walls removed to permit view of the interior of the furnace containing carrier members on which rest carbon bodies.

DESCRIPTION OF THE INVENTION

Referring to the drawing, a furnace constructed according to the invention consists, for example, of a flat furnace floor 1 made of graphite bricks into which are fitted carrier members 2 for receiving the bodies to be graphitized. The carrier members, made of graphite are preferably with prismatic guides, functions for the guiding and holding of the carbon bodies 3, which are arranged in one row or several continuous rows between the electrodes. In this manner the operation is greatly simplified and made more reliable and at the same time, the number of contact points between construction members and isolation materials is limited to a few points of contacts. The end face of each carbon body is in contact with the body which precedes it in the row, and, if required, the contact resistance can be reduced by placing in between layers of flexible graphite foil or fibrous graphite, for example, graphite packing (cloth).

Flexible graphite foil is manufactured by the thermal exfoliation of graphite intercalation compounds. The exfoliated graphite can be calendered into flexible foil and laminates and pressed into shape. Fibrous carbon or carbon felts are produced by processing either synthetic or natural fibers at high temperatures. Graphite felt is produced by heat treating carbon felt at a temperature in excess of 2500°. The improved characteristics of the graphite felt may make it the preferred material but frequently the carbon felt is adequate for the purpose.

On the shorter sides of the furnace floor which, as a rule, is shaped as a long rectangle, the watercooled graphite electrodes are disposed in end walls 4 of noncombustible material, which are connected by busbars 6 with a transformer or rectifier. At least one electrode 5 is movable in the direction of the longitudinal axis of the furnace. The side limits of the furnace floor are formed by U-profiles 7 into which are fitted the furnace walls. The furnace walls form a gas-tight enclosure which walls, for example, may consist of several shell-shaped segments 8 which overlap at the joining points. The end segments fit into slot-shaped recesses of the end walls or rest on it. The sealing of the wall segments to each other and to the furnace floor and electrode guideways is effected by suitable flat gaskets made, for example, of asbestos graphite. In another embodiment, the side walls are fixed to the furnace floor and furnished with U-profiles towards the furnace roof. The furnace space is formed towards the roof by movable ceiling elements with angular profiles, which mate with the U-profiles and fit in slot-shaped recesses of the end walls.

The furnace walls on the side towards the furnace interior are lined with isolation layers 9, which, preferably contain graphite felt and graphite foil. The term graphite felt may be interpreted to include carbon felts. The first isolation layer towards the interior of the furnace consists mainly of a layer of graphite foil which has a highly anisotropic heat conductivity. A layer of graphite felt follows and, if necessary, further layers of foils and felts. The layers are bonded to each other and to the sheet steel furnace walls by a binding material which contains a resin which can be hardened and carbonized, for example, phenolformaldehyde resin or furan resin.

The outside of the furnace walls are provided with a cooling system 10 whereby the cooling is effected either directly by a sprinkling system or by cooling tubes, not shown, which, for example, are welded or soldered to the furnace walls and connected by flexible hoses with a water tank and a pump. For introduction of a protective gas into the furnace interior, for example nitrogen, at least one orifice or tube 11 is installed through the furnace wall with an additional duct 12 for the discharge of the protective gas and the combustion gases such as sulfur dioxide and carbon monoxide, as impurities, formed during the graphitization process.

After removing the impurities contained in the gases discharged from the furnace by a suitable separator or washer, the purified discharged gas is again fed to the furnace.

A considerable advantage of a graphitization furnace built according to the invention, is the relatively low specific energy consumption of approximately 2.5 – 3.0 kWh/kg. Since the furnace contains no granular isolation material and the carbon bodies are only at a few points in contact with construction members, adhesion of such materials to the surfaces of the carbon bodies is made impossible and additional processing steps for cleaning these surfaces are eliminated. Because of the controlled holding of the carbon bodies and the lack of the granular isolation materials, the times for charging and discharging of the furnace are shorter than in furnaces of known construction and, furthermore, the total cycle time is reduced by the faster cooling of the graphite bodies. Finally, the release of excess gases into the atmosphere, is completely avoided by the enclosed gas circulation thereby eliminating a polution problem.

The following example illustrates the operating mode of a graphitization furnace in accordance with the invention:

Three cylindrical carbon bodies with a diameter of 600 mm and a length of approximately 2100 mm were positioned in a row, each on two carrier elements. One of the two electrodes was pressed against the row with a pressure of $10^{5N}/m^2$ ($10^{5Newton}/meter^2$), so that the bodies were securely clamped between the electrodes. After closing of the furnace space by the insertion of wall segments and after purging of the furnace by nitrogen, the furnace operation was started by energizing a transformer. During the heating-up period of 4.5 hours, the furnace walls were cooled by sprinkling with water, combustion gases together with the protective gases were withdrawn from the furnace and the combustion gases separated from the withdrawn gases. After electrical shutoff of the transformer and a cooling period of 1.5 hours, the furnace walls were removed and subsequently the graphitized bodies were taken from the furnace. Then a new graphitization cycle was started by loading of three new carbon bodies.

There is claimed:

1. Furnace for the graphitization of carbon bodies by direct resistance heating which comprises two current conducting electrodes movable in the longitudinal furnace axis, carbon bodies in an arrangement of at least one row clamped between said electrodes with the end surface of each body in contact with an end surface of an adjacent body in the row, and each end surface of bodies at the end of a row contacting an electrode, carrier members disposed in the furnace floor for receiving the carbon bodies, said furnace gas-tightly enclosing said carbon bodies, said furnace having shell-shaped walls with movable segments and said furnace having layers consisting of isolation materials to protect said carbon bodies from attack by oxygen from the air, and said furnace having a space containing gases between the carbon bodies and the furnace walls.

2. Furnace according to claim 1 wherein the furnace walls are provided on the outside with water cooling and on the inside with an isolation layer of graphite felt and graphite foil.

3. Furnace according to claim 1 wherein the furnace walls are provided with an inlet for introduction and on outlet for discharge of a protective gas.

* * * * *